United States Patent
Miyazaki

(10) Patent No.: US 8,320,447 B2
(45) Date of Patent: Nov. 27, 2012

(54) ENCODING APPARATUS AND ENCODING METHOD, AND DECODING APPARATUS AND DECODING METHOD

(75) Inventor: Masashi Miyazaki, Tokyo (JP)

(73) Assignee: Sony Corporation, Tokyo (JP)

( * ) Notice: Subject to any disclaimer, the term of this patent is extended or adjusted under 35 U.S.C. 154(b) by 381 days.

(21) Appl. No.: 12/762,653

(22) Filed: Apr. 19, 2010

(65) Prior Publication Data

US 2010/0303147 A1 Dec. 2, 2010

(30) Foreign Application Priority Data

May 27, 2009 (JP) ................................. 2009-128118

(51) Int. Cl.
*H04N 7/12* (2006.01)
(52) U.S. Cl. ......... 375/240.01; 375/240.02; 375/240.25; 375/E7.076; 375/E7.027
(58) Field of Classification Search . 375/240.01–240.29
See application file for complete search history.

(56) References Cited

U.S. PATENT DOCUMENTS

| | | | |
|---|---|---|---|
| 5,974,174 A * | 10/1999 | Hozumi | 382/199 |
| 6,512,793 B1 * | 1/2003 | Maeda | 375/240.08 |
| 2003/0174775 A1 | 9/2003 | Nagaya et al. | 375/240.12 |
| 2004/0008769 A1 | 1/2004 | Winger | |
| 2007/0110153 A1 * | 5/2007 | Cho et al. | 375/240.12 |
| 2008/0130747 A1 * | 6/2008 | Moriya et al. | 375/240.15 |
| 2008/0165849 A1 * | 7/2008 | Moriya et al. | 375/240.15 |
| 2008/0198270 A1 * | 8/2008 | Hobbs et al. | 348/708 |
| 2009/0316792 A1 * | 12/2009 | Shigemoto et al. | 375/240.18 |
| 2010/0040148 A1 * | 2/2010 | Marpe et al. | 375/240.16 |
| 2010/0272191 A1 * | 10/2010 | Dorea et al. | 375/240.29 |
| 2010/0303147 A1 * | 12/2010 | Miyazaki | 375/240.02 |
| 2011/0110435 A1 * | 5/2011 | Li et al. | 375/240.25 |
| 2012/0147972 A1 * | 6/2012 | Miyazaki | 375/240.23 |

FOREIGN PATENT DOCUMENTS

| | | |
|---|---|---|
| EP | 1 545 133 A2 | 6/2005 |
| JP | 11-088191 | 3/1999 |
| JP | 2007-116436 | 5/2007 |
| JP | 2009-17472 | 1/2009 |
| WO | WO 2004/038921 A2 | 5/2004 |

OTHER PUBLICATIONS

U.S. Appl. No. 13/253,176, filed Oct. 5, 2011, Miyazaki.

(Continued)

*Primary Examiner* — Sath V Perungavoor
*Assistant Examiner* — Asmamaw Tarko
(74) *Attorney, Agent, or Firm* — Oblon, Spivak, McClelland, Maier & Neustadt, L.L.P.

(57) ABSTRACT

An encoding apparatus includes a receiving section receiving syntax information defined by an encoding standard, a first encoding section encoding the received syntax information to generate encoded information, a transferring section transferring transmission encoded information based on the encoded information generated by the first encoding section, a second encoding section encoding reproduced encoded information reproduced from the transferred transmission encoded information, a conversion section converting the encoded information encoded by the first encoding section into redefined encoded information, to generate the transmission encoded information in accordance with the transfer capacity of the transferring section and the processing speed of encoding in each of the first encoding section and the second encoding section so as not to cause delay in encoding in the first encoding section or the second encoding section, and an inverse conversion section inversely converting the converted redefined encoded information to generate the reproduced encoded information.

20 Claims, 10 Drawing Sheets

OTHER PUBLICATIONS

European Search Report mailed Aug. 2, 2012, European Application No. 10163249.5.

European Office Action mailed Aug. 28, 2012, European Application No. 10 163 249.5.

Detlev Marpe, et al., Context-Based Adaptive Binary Arithmetic Coding in the H.264/AVC Video Compression Standard, IEEE Transactions on Circuits and Systems for Video Technology, vol. 13, No. 7, Jul. 2003, pp. 620-636.

* cited by examiner

FIG. 2

| ABSOLUTE VALUE OF mvd_lx | BINARY CODE bin | | REDEFINED BINARY CODE binA | |
|---|---|---|---|---|
| | bin STRING | BIT LENGTH | bin STRING | BIT LENGTH |
| 0 | 0 | 2 | 10 | 3 |
| 1 | 10S | 3 | 110S | 4 |
| 2 | 110S | 4 | 1110S | 5 |
| 3 | 1110S | 5 | 11110S | 6 |
| 4 | 11110S | 6 | 111110S | 7 |
| 5 | 111110S | 7 | 1111110S | 8 |
| 6 | 1111110S | 8 | 11111110S | 9 |
| 7 | 11111110S | 9 | 111111110S | 10 |
| 8 | 111111110S | 10 | 1111111110S | 11 |
| 9-16 | 1111111110XXXS | 14 | 00000000001XXXS | 16 |
| 17-32 | 11111111110XXXXS | 16 | 0000000001XXXXS | 16 |
| 33-64 | 111111111110XXXXXS | 18 | 000000001XXXXXS | 16 |
| 65-128 | 1111111111110XXXXXXS | 20 | 00000001XXXXXXS | 16 |
| 129-256 | 11111111111110XXXXXXXS | 22 | 0000001XXXXXXXS | 16 |
| 257-512 | 111111111111110XXXXXXXXS | 24 | 000001XXXXXXXXS | 16 |
| 513-1024 | 1111111111111110XXXXXXXXXS | 26 | 00001XXXXXXXXXS | 16 |
| 1025-2048 | 11111111111111110XXXXXXXXXXS | 28 | 0001XXXXXXXXXXS | 16 |
| 2049-4096 | 111111111111111110XXXXXXXXXXXS | 30 | 001XXXXXXXXXXXS | 16 |
| 4097-8192 | 1111111111111111110XXXXXXXXXXXXS | 32 | 01XXXXXXXXXXXXS | 16 |
| 8193-16384 | 11111111111111111110XXXXXXXXXXXXXS | 34 | — | — |
| ... | ... | ... | — | — |

FIG. 3

| ABSOLUTE VALUE OF coeff_abs_level_minus1 | BINARY CODE bin | | REDEFINED BINARY CODE binA | |
|---|---|---|---|---|
| | bin STRING | BIT LENGTH | bin STRING | BIT LENGTH |
| 0 | 0 | 0 | 10 | 2 |
| 1 | 10 | 2 | 110 | 3 |
| 2 | 110 | 3 | 1110 | 4 |
| 3 | 1110 | 4 | 11110 | 5 |
| 4 | 11110 | 5 | 111110 | 6 |
| 5 | 111110 | 6 | 1111110 | 7 |
| 6 | 1111110 | 7 | 11111110 | 8 |
| 7 | 11111110 | 8 | 111111110 | 9 |
| 8 | 111111110 | 9 | 1111111110 | 10 |
| 9 | 1111111110 | 10 | 11111111110 | 11 |
| 10 | 11111111110 | 11 | 111111111110 | 12 |
| 11 | 111111111110 | 12 | 1111111111110 | 13 |
| 12 | 1111111111110 | 13 | 11111111111110 | 14 |
| 13 | 11111111111110 | 14 | 111111111111110 | 15 |
| 14 | 111111111111110 | 15 | 0000000000000001 | 16 |
| 15-16 | 1111111111111110X | 17 | 000000000000001X | 16 |
| 17-20 | 11111111111111110XX | 19 | 00000000000001XX | 16 |
| 21-28 | 111111111111111110XXX | 21 | 0000000000001XXX | 16 |
| 29-44 | 1111111111111111110XXXX | 23 | 000000000001XXXX | 16 |
| 45-76 | 11111111111111111110XXXXX | 25 | 00000000001XXXXX | 16 |
| 77-140 | 111111111111111111110XXXXXX | 27 | 0000000001XXXXXX | 16 |
| 141-268 | 1111111111111111111110XXXXXXX | 29 | 000000001XXXXXXX | 16 |
| 269-524 | 11111111111111111111110XXXXXXXX | 31 | 00000001XXXXXXXX | 16 |
| 525-1036 | 111111111111111111111110XXXXXXXXX | 33 | 0000001XXXXXXXXX | 16 |
| 1037-2060 | 1111111111111111111111110XXXXXXXXXX | 35 | 000001XXXXXXXXXX | 16 |
| 2061-4108 | 11111111111111111111111110XXXXXXXXXXX | 37 | 00001XXXXXXXXXXX | 16 |
| 4109-8204 | 111111111111111111111111110XXXXXXXXXXXX | 39 | 0001XXXXXXXXXXXX | 16 |
| 8205-16396 | 1111111111111111111111111110XXXXXXXXXXXXX | 41 | 001XXXXXXXXXXXXX | 16 |
| 16397-32780 | 11111111111111111111111111110XXXXXXXXXXXXXX | 43 | 01XXXXXXXXXXXXXX | 16 |
| ... | ... | ... | ... | ... |

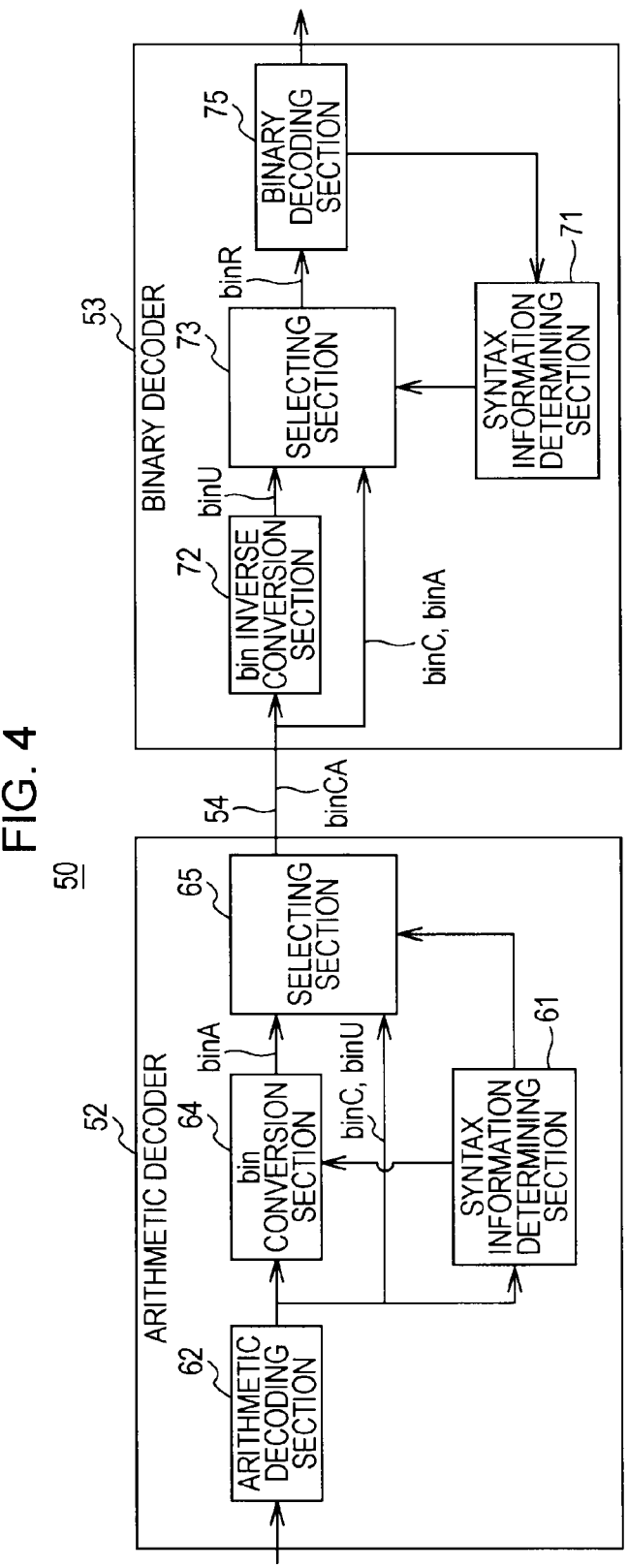

FIG. 5A  PFX
0

FIG. 5B  PFX                    PM
1 1 0 S

FIG. 5C  PFX                        SP GSX  SFX
1 1 1 1 1 1 1 1 1 0 X X X S    PM

FIG. 5D  PFX                            GPX SP GSX  SFX
1 1 1 1 1 1 1 1 1 1 1 0 X X X X X S    PM

FIG. 6C                                HZ           SPK GSX
1 1 1 1 1 1 1 1 1 0 X X X S  →  0 0 0 0 0 0 0 0 1 X X X S  PM

FIG. 6D                                    HZ              SPK GSX
1 1 1 1 1 1 1 1 1 1 1 0 X X X X X S  →  0 0 0 0 0 0 0 0 0 1 X X X X X S  PM

FIG. 11

| ABSOLUTE VALUE OF mvd_lx | bin | | REDEFINED bin | |
|---|---|---|---|---|
| | bin STRING | BIT LENGTH | bin STRING | BIT LENGTH |
| 0 | 0 | 2 | 10 | 3 |
| 1 | 10S | 3 | 110S | 4 |
| 2 | 110S | 4 | 1110S | 5 |
| 3 | 1110S | 5 | 11110S | 6 |
| 4 | 11110S | 6 | 111110S | 7 |
| 5 | 111110S | 7 | 1111110S | 8 |
| 6 | 1111110S | 8 | 11111110S | 9 |
| 7 | 11111110S | 9 | 111111110S | 10 |
| 8 | 111111110S | 10 | 1111111110S | 11 |
| 9-16 | 1111111110XXXS | 14 | 000000000001XXXS | 15 |
| 17-32 | 11111111110XXXXS | 16 | 0000000001XXXXS | 15 |
| 33-64 | 111111111110XXXXXS | 18 | 000000001XXXXXS | 15 |
| 65-128 | 1111111111110XXXXXXS | 20 | 00000001XXXXXXS | 15 |
| 129-256 | 11111111111110XXXXXXXS | 22 | 0000001XXXXXXXS | 15 |
| 257-512 | 111111111111110XXXXXXXXS | 24 | 000001XXXXXXXXS | 15 |
| 513-1024 | 1111111111111110XXXXXXXXXS | 26 | 00001XXXXXXXXXS | 15 |
| 1025-2048 | 11111111111111110XXXXXXXXXXS | 28 | 0001XXXXXXXXXXS | 15 |
| 2049-4096 | 111111111111111110XXXXXXXXXXXS | 30 | 001XXXXXXXXXXXS | 15 |
| 4097-8192 | 1111111111111111110XXXXXXXXXXXXS | 32 | 01XXXXXXXXXXXXS | 15 |
| 8193-16384 | 11111111111111111110XXXXXXXXXXXXXS | 34 | — | — |
| ... | ... | ... | — | — |

FIG. 12

| ABSOLUTE VALUE OF coeff_abs_level_minus1 | bin STRING | BIT LENGTH | REDEFINED bin STRING | BIT LENGTH |
|---|---|---|---|---|
| 0 | 0 | 0 | 10 | 2 |
| 1 | 10 | 2 | 110 | 3 |
| 2 | 110 | 3 | 1110 | 4 |
| 3 | 1110 | 4 | 11110 | 5 |
| 4 | 11110 | 5 | 111110 | 6 |
| 5 | 111110 | 6 | 1111110 | 7 |
| 6 | 1111110 | 7 | 11111110 | 8 |
| 7 | 11111110 | 8 | 111111110 | 9 |
| 8 | 111111110 | 9 | 1111111110 | 10 |
| 9 | 1111111110 | 10 | 11111111110 | 11 |
| 10 | 11111111110 | 11 | 111111111110 | 12 |
| 11 | 111111111110 | 12 | 1111111111110 | 13 |
| 12 | 1111111111110 | 13 | 11111111111110 | 14 |
| 13 | 11111111111110 | 14 | 111111111111110 | 15 |
| 14 | 111111111111110 | 15 | 000000000000001 | 15 |
| 15-16 | 1111111111111110X | 17 | 00000000000001X | 15 |
| 17-20 | 11111111111111110XX | 19 | 0000000000001XX | 15 |
| 21-28 | 111111111111111110XXX | 21 | 000000000001XXX | 15 |
| 29-44 | 1111111111111111110XXXX | 23 | 00000000001XXXX | 15 |
| 45-76 | 11111111111111111110XXXXX | 25 | 0000000001XXXXX | 15 |
| 77-140 | 111111111111111111110XXXXXX | 26 | 000000001XXXXXX | 15 |
| 141-268 | 1111111111111111111110XXXXXXX | 29 | 00000001XXXXXXX | 15 |
| 269-524 | 11111111111111111111110XXXXXXXX | 31 | 0000001XXXXXXXX | 15 |
| 525-1036 | 111111111111111111111110XXXXXXXXX | 33 | 000001XXXXXXXXX | 15 |
| 1037-2060 | 1111111111111111111111110XXXXXXXXXX | 35 | 00001XXXXXXXXXX | 15 |
| 2061-4108 | 11111111111111111111111110XXXXXXXXXXX | 37 | 0001XXXXXXXXXXX | 15 |
| 4109-8204 | 111111111111111111111111110XXXXXXXXXXXX | 39 | 001XXXXXXXXXXXX | 15 |
| 8205-16396 | 1111111111111111111111111110XXXXXXXXXXXXX | 41 | 01XXXXXXXXXXXXX | 15 |
| 16397-32780 | ⋮ | ⋮ | ⋮ | ⋮ |

ENCODING APPARATUS AND ENCODING METHOD, AND DECODING APPARATUS AND DECODING METHOD

BACKGROUND OF THE INVENTION

1. Field of the Invention

The present invention relates to an encoding apparatus and an encoding method, and a decoding apparatus and a decoding method which are suitable for application to an image processing apparatus that encodes or decodes image data in accordance with the H.264/AVC (Advanced Video Coding) scheme, for example.

2. Description of the Related Art

In the related art, the CABAC (Context Adaptive Binary Arithmetic Coding) scheme is adopted in the H.264/AVC scheme. As a CABAC encoding apparatus for encoding image data in this CABAC scheme, there is a type of CABAC encoding apparatus configured to execute binary encoding and arithmetic encoding separately (see, for example, Japanese Unexamined Patent Application Publication No. 2009-17472). In such a CABAC encoding apparatus, a binary encoder that executes binary encoding and an arithmetic encoder that executes arithmetic encoding are connected to each other via a transmission path.

SUMMARY OF THE INVENTION

The H.264/AVC scheme adopts UEGk (Concatenated Unary/k-th Order Exponential Golomb Binarization) for some binary code. UEGk has a characteristic that the maximum bit length is large.

For this reason, when supplying binary code from the binary encoder to the arithmetic encoder in the CABAC encoding apparatus, transmission of the binary code to the arithmetic encoder takes much time if the maximum bit length of the binary code exceeds the capacity of the transmission path.

At this time, it is necessary for the binary encoder to wait for the binary code to be transferred to the arithmetic encoder. That is, the CABAC encoding apparatus has a problem in that with the transmission path acting as a bottleneck, the processing capacity of the binary encoder is not fully exploited, resulting in a decrease in the processing speed of encoding.

The same also applies to a CABAC decoding apparatus which decodes a bit stream in the CABAC scheme. That is, the CABAC decoding apparatus has a problem in that when transferring binary code from an arithmetic decoder to a binary decoder, remaining of binary code attributable to the transmission path causes a decrease in the processing speed of decoding.

It is desirable to provide an encoding apparatus and an encoding method which can improve the processing speed of encoding, and a decoding apparatus and a decoding method which can improve the processing speed of decoding.

An encoding apparatus according to an embodiment of the present invention includes a receiving section receiving syntax information defined by an encoding standard, a first encoding section encoding the syntax information received by the receiving section to generate encoded information, a transferring section transferring transmission encoded information based on the encoded information generated by the first encoding section, a second encoding section encoding reproduced encoded information reproduced from the transmission encoded information transferred by the transferring section, a conversion section converting the encoded information encoded by the first encoding section into redefined encoded information, to generate the transmission encoded information in accordance with a transfer capacity of the transferring section and a processing speed of encoding in each of the first encoding section and the second encoding section so as not to cause delay in encoding in the first encoding section or the second encoding section, and an inverse conversion section inversely converting the redefined encoded information converted by the conversion section to generate the reproduced encoded information.

Consequently, the encoding apparatus can prevent delay in encoding in one of the encoding sections attributable to the transfer capacity of the transferring section, thereby making it possible to improve the processing speed of encoding.

In addition, an encoding method according to an embodiment of the present invention includes the steps of receiving syntax information defined by an encoding standard, performing a first encoding of encoding the received syntax information to generate encoded information, transferring transmission encoded information based on the encoded information generated by the first encoding, performing a second encoding of encoding reproduced encoded information reproduced from the transferred transmission encoded data, converting the encoded information encoded by the first encoding into redefined encoded information, to generate the transmission encoded information in accordance with a transfer capacity of the transferring and a processing speed of each of the first encoding and the second encoding so as not to cause delay in the first encoding or the second encoding, and inversely converting the converted redefined encoded information to generate the reproduced encoded information.

Consequently, the encoding method can prevent delay in one of the encodings attributable to the transfer capacity, thereby making it possible to improve the processing speed of encoding.

Further, a decoding apparatus according to an embodiment of the present invention includes a receiving section receiving a bit stream encoded in accordance with an encoding standard, a first decoding section decoding the bit stream received by the receiving section to generate decoded information, a transferring section transferring transmission decoded information based on the decoded information generated by the first decoding section, a second decoding section decoding reproduced decoded information reproduced from the transmission decoded information transferred by the transferring section, a conversion section converting the decoded information decoded by the first decoding section into redefined decoded information, to generate the transmission decoded information in accordance with a transfer capacity of the transferring section and a processing speed of decoding in each of the first decoding section and the second decoding section so as not to cause delay in decoding in the first decoding section or the second decoding section, and an inverse conversion section inversely converting the redefined decoded information converted by the conversion section to generate the reproduced decoded information.

Consequently, the decoding apparatus can prevent delay in decoding in one of the decoding sections attributable to the transfer capacity of the transferring section, thereby making it possible to improve the processing speed of decoding.

Further, a decoding method according to an embodiment of the present invention includes the steps of receiving a bit stream encoded in accordance with an encoding standard, performing a first decoding of decoding the received bit stream to generate decoded information, transferring transmission decoded information based on the decoded information generated by the first decoding, performing a second decoding of decoding reproduced decoded information reproduced from the transferred transmission decoded information, converting the decoded information decoded by the first decoding into redefined decoded information, to generate the transmission decoded information in accordance with a transfer capacity of the transferring and a processing speed of each of the first decoding and the second decoding so as not to cause delay in the first decoding or the second decoding, and inversely converting the converted redefined decoded information to generate the reproduced decoded information.

Consequently, the decoding method can prevent delay in one of the decodings attributable to the transfer capacity, thereby making it possible to improve the processing speed of decoding.

BRIEF DESCRIPTION OF THE DRAWINGS

FIG. 2 is a schematic diagram showing binary code and redefined binary code with respect to motion vector information;

FIG. 3 is a schematic diagram showing binary code and redefined binary code with respect to a coefficient absolute value;

FIG. 4 is a schematic diagram showing the configuration of a CABAC decoding apparatus;

FIGS. 5A to 5D are schematic diagrams showing the configuration of binary code with respect to motion information;

FIGS. 6A to 6D are schematic diagrams for explaining generation of redefined binary code with respect to motion vector information;

FIGS. 7A to 7D are schematic diagrams showing the configuration of binary code with respect to a coefficient absolute value;

FIGS. 8A to 8D are schematic diagrams for explaining generation of redefined binary code with respect to a coefficient absolute value;

FIG. 11 is a schematic diagram showing redefined binary code with respect to motion vector information according to another embodiment; and FIG. 12 is a schematic diagram showing redefined binary code with respect to a coefficient absolute value according to another embodiment.

DESCRIPTION OF THE PREFERRED EMBODIMENTS

Figure 1:
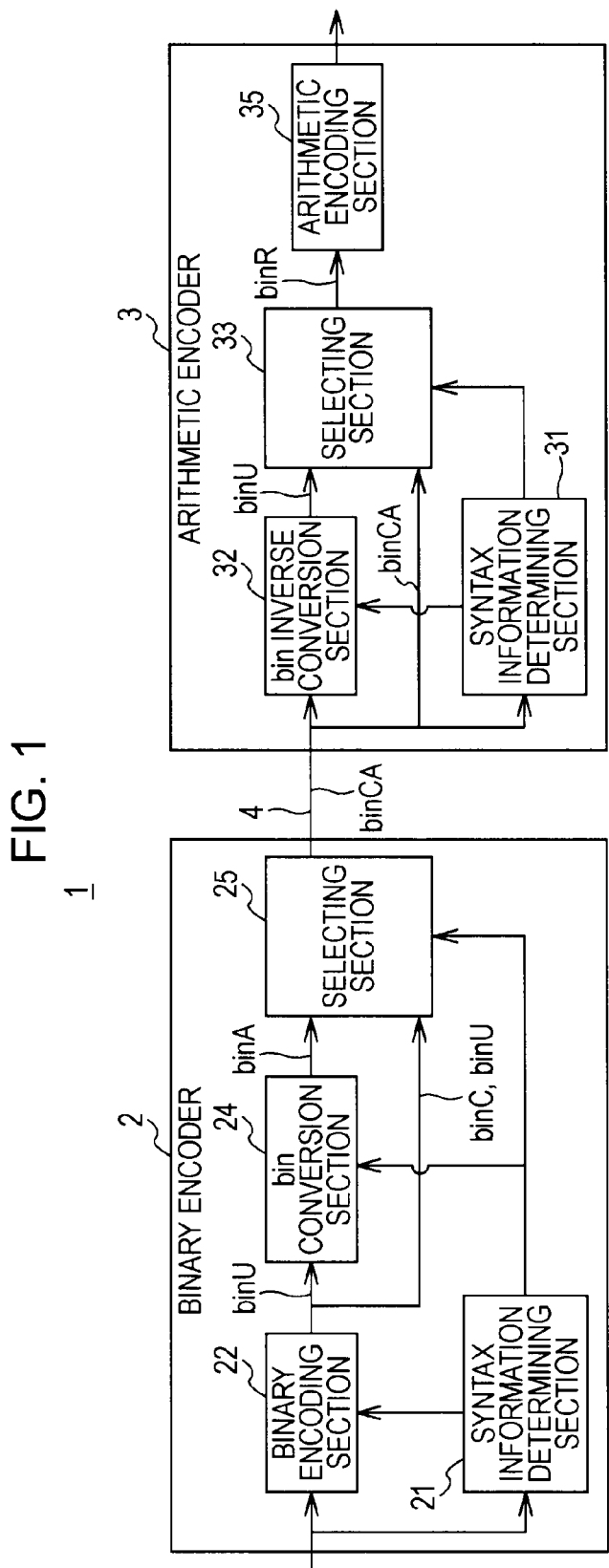
FIG. 1 is a schematic diagram showing the configuration of a CABAC encoding apparatus.

Hereinbelow, embodiments of the present invention will be described in detail with reference to the drawings. It should be noted that the description will be given in the following order of topics.
1. Embodiment (redefinition of bin)
2. Other Embodiments 1. Embodiment 1-1. Configuration of CABAC Encoding Apparatus Reference numeral 1 in FIG. 1 denotes a CABAC encoding apparatus 1 as a whole. The CABAC encoding apparatus 1 includes a binary encoder 2, an arithmetic encoder 3, and a transmission path 4 connecting between the binary encoder 2 and the arithmetic encoder 3. The CABAC encoding apparatus 1 executes a CABAC encoding process in accordance with the H.264/AVC standard.

Image data is supplied to an image processing apparatus (not shown) having the CABAC encoding apparatus 1 at a frame rate according to each individual standard. The image processing apparatus generates syntax information via an encoding process through a plurality of pre-encoding sections such as an intra-prediction section, a motion compensation section, a DCT section, and a quantization section, and supplies the syntax information to the CABAC encoding apparatus 1. The image processing apparatus encodes image data substantially in real-time in accordance with this frame rate, thereby omitting buffers as much as possible in the plurality of pre-encoding sections for simplified configuration.

It is desirable that the CABAC encoding apparatus 1 perform binary encoding and arithmetic encoding on syntax information at a processing speed appropriate to the frame rate. However, arithmetic encoding is complex, which makes it difficult to execute an arithmetic encoding process at a processing speed appropriate to the frame rate. Accordingly, in the CABAC encoding apparatus 1, although a buffer is provided to the arithmetic encoder 3, a buffer is omitted in the binary encoder 2.

In order for the binary encoder 2 to binary-encode syntax information at a processing speed appropriate to the frame rate, it is necessary, for at least part of syntax information, to binary-encode two pieces of syntax information during one cycle of the operation clock of the image processing apparatus. Accordingly, for syntax information to be binary-encoded in UEGk (Concatenated Unary/k-th Order Exponential Golomb Binarization), the binary encoder 2 is configured to binary-encode two pieces of such syntax information in one cycle.

The binary encoder 2 converts syntax information supplied from an external device into binary code bin, and further converts this into binary code bin to be transmitted (hereinafter, this will be referred to as transmission binary code binCA) and supplies the transmission binary code binCA to the arithmetic encoder 3 via the transmission path 4. As for the syntax information, the kinds of syntax information defined by the H.264/AVC standard are supplied to the binary encoder 2 in the order defined by the H.264/AVC standard.

The transmission path 4 can transmit 32 pieces (bits) of data in one cycle (clock cycle). The arithmetic encoder 3 reproduces reproduced binary code binR from transmission binary code binCA, and performs arithmetic encoding on the reproduced binary code binR. The arithmetic encoder 3 has a buffer (not shown) with a relatively large storage capacity located before a syntax information determining section 31 and a bin inverse conversion section 32. Since the processing capacity of the arithmetic encoder 3 is lower than that of the binary encoder 2, transmission binary code binCA is held in this buffer, and the transmission binary code binCA is read from the buffer to execute processing.

The standard specified by the H.264/AVC scheme specifies that among kinds of syntax information, motion vector information mvd_10 indicative of motion vector information in the horizontal direction and motion vector information mvd_11 indicative of motion vector information in the vertical direction (hereinafter, these will be collectively referred to as motion vector information mvd_lx), and a coefficient absolute value coeff_abs_level_minus1 indicative of the absolute value of a quantization coefficient be binary-encoded in UEGk.

As shown in the left part of FIG. 2, in UEGk, truncated unary (hereinafter, this will be referred to as TU) encoding and exponential Golomb encoding schemes are combined.

The left part of FIG. 2 shows binary code bin with respect to motion vector information mvd_lx.

As can be appreciated from the drawing, the number of digits of binary code bin with respect to motion vector information mvd_lx increases as the value of the motion vector information mvd_lx becomes larger, reaching 34 (bits) or more at the maximum. Since the transmission path 4 can transmit only 32 pieces (bits) of data in one cycle, to transmit binary code bin of 34 (bits), for example, two cycles are necessary.

As shown in the left part of FIG. 3, it is appreciated that the same applies to binary code bin with respect to a coefficient absolute value coeff_abs_level_minus1, so that its number of digits reaches 43 (bits) or more at the maximum. Hereinafter, pieces of binary code bin with respect to motion vector information mvd_lx and a coefficient absolute value coeff_abs_level_minus1 which are to be binarized using UEGk will be collectively referred to as to-be-redefined binary code binU, and binary code bin other than the to-be-redefined binary code binU will be referred to as normal binary code binC.

Provided that to-be-redefined binary code binU is to be transferred as it is via the transmission path 4, it is not possible for the CABAC encoding apparatus 1 to guarantee that two pieces of to-be-redefined binary code binU be transferred in each cycle. This is because the maximum bit length of the to-be-redefined binary code binU exceeds the transmission capacity of the transmission path 4. This causes to-be-redefined binary code binU to remain within the binary encoder 2 in the CABAC encoding apparatus 1, and thus it is not possible to binary-encode two pieces of syntax in one cycle.

Accordingly, the CABAC encoding apparatus 1 redefines to-be-redefined binary code binU into redefined binary code binA, and supplies the redefined binary code binA to the arithmetic encoder 3. This makes it possible for the CABAC encoding apparatus 1 to guarantee that two pieces of redefined binary code binA be transferred to the arithmetic encoder 3 in every one cycle at all times, thereby allowing the binary encoder 2 to execute a binary encoding process at the maximum processing speed. That is, the binary encoder 2 generates redefined binary code binA in such a way that every piece of redefined binary code binA has a length of no more than 16 (bits) equal to half the transmission capacity of the transmission path 4, which is 32 (bits).

Specifically, upon supply of syntax information from an external device (pre-encoding section), the binary encoder 2 supplies the syntax information to a syntax information determining section 21 and a binary encoding section 22. The syntax information determining section 21 determines the kind of the syntax information from the order of the syntax information, and supplies a kind determination signal to the binary encoding section 22.

If the syntax information is motion vector information mvd_lx or a coefficient absolute value coeff_abs_level_minus1, the syntax information determining section 21 supplies a redefinition selection control signal to a bin conversion section 24 and a selecting section 25.

The binary encoding section 22 binarizes the syntax information in accordance with a kind determining signal to sequentially generate binary code bin, and supplies the binary code bin to each of the bin conversion section 24 and the selecting section 25.

The bin conversion section 24 generates redefined binary code binA in accordance with a redefinition selection control signal. At this time, to ensure that two pieces of to-be-redefined binary code binU be sent in one cycle via the transmission path 4, the bin conversion section 24 generates redefined binary code binA of no more than 16 (bits) in length which is ½ of the transmission capacity of the transmission path 4 per cycle. A redefined binary code generating process for generating redefined binary code binA will be described later. The bin conversion section 24 supplies the redefined binary code binA to the selecting section 25.

As a result, normal binary code binC and redefined binary code binA are supplied to the selecting section 25 from the binary encoding section 22 and the bin conversion section 24, respectively. If a redefinition selection control signal is supplied from the syntax information determining section 21, the selecting section 25 recognizes the binary code bin supplied from the binary encoding section 22 as being to-be-redefined binary code binU, and outputs redefined binary code binA as transmission binary code binCA. As a result, the transmission binary code binCA (redefined binary code binA) is supplied to the arithmetic encoder 3 via the transmission path 4.

On the other hand, if a redefinition selection control signal is not supplied from the syntax information determining section 21, the selecting section 25 recognizes the binary code bin supplied from the binary encoding section 22 as being normal binary code binC, and outputs the normal binary code binC as transmission binary code binCA. As a result, the transmission binary code binCA (normal binary code binC) is supplied to the arithmetic encoder 3 via the transmission path 4.

Consequently, the binary encoder 2 supplies normal binary code binC and redefined binary code binA of 16 (bits) or less in length (i.e., transmission binary code binCA) to the arithmetic encoder 3 via the transmission path 4. The binary encoder 2 can ensure that any combination of two pieces of redefined binary code binA does not exceed the transmission capacity of the transmission path 4. As a result, the binary encoder 2 can guarantee with reliability that two pieces of redefined binary code binA be sequentially generated per cycle.

Upon supply of these pieces of transmission binary code binCA via the transmission path 4, the arithmetic encoder 3 sequentially supplies these pieces of transmission binary code binCA to the syntax information determining section 31 and the bin inverse conversion section 32. The syntax information determining section 31 determines the kinds of these pieces of transmission binary code binCA from their order.

If transmission binary code binCA supplied from the binary encoder 2 is redefined binary code binA corresponding to motion vector information mvd_lx or a coefficient absolute value coeff_abs_level_minus1, the syntax information determining section 31 supplies a redefinition selection control signal to the bin inverse conversion section 32 and a selecting section 33.

The bin inverse conversion section 32 performs an inverse conversion on the redefined binary code binA to reproduce to-be-redefined binary code binU, and supplies this to-be-redefined binary code binU to an arithmetic encoding section 35. As a result, transmission binary code binCA (each of normal binary code binC and redefined binary code binA) and to-be-redefined binary code binU are supplied to the selecting section 33.

If a redefinition selection control signal is supplied, the selecting section 33 recognizes that redefined binary code binA has been supplied from the binary encoder 2, and outputs the to-be-redefined binary code binU supplied from the bin inverse conversion section 32 to the arithmetic encoding section 35 as reproduced binary code binR. On the other hand, if a redefinition selection control signal is not supplied from the syntax information determining section 31, the selecting section 33 recognizes the transmission binary code binCA supplied from the binary encoder 2 as being normal binary code binC, and supplies the normal binary code binC to the arithmetic encoding section 35.

As a result, reproduced binary code binR (each of normal binary code binC and to-be-redefined binary code binU that has been reproduced) in compliance with the AVC/H.264 scheme is supplied to the arithmetic encoding section 35. The arithmetic encoding section 35 performs arithmetic encoding on the reproduced binary code binR, and outputs the result to an external device (not shown) as an output stream.

In this way, the CABAC encoding apparatus 1 generates transmission binary code binCA by taking into account the binary encoding capacity of the binary encoding section 22 for binary-encoding two pieces of syntax information per cycle, and the transmission capacity of the transmission path 4 capable of transmitting 32 pieces (bits) of data per cycle. The CABAC encoding apparatus 1 generates transmission binary code binCA in such a way as to maintain the transmission speed that can maximally exploit the binary encoding capacity (generation of two pieces of binary code bin per cycle). That is, the CABAC encoding apparatus 1 generates transmission binary code binCA in such a way that any combination of two pieces of transmission binary code binCA does not exceed 32 (bits), with respect to redefined binary code binA corresponding to to-be-redefined binary code binU.

That is, among pieces of binary code bin, the CABAC encoding apparatus 1 redefines binary code bin (to-be-redefined binary code binU) with respect to the kind of syntax information to be encoded in UEGk, so that the binary code bin has a length of no more than 16 (bits).

Thus, the CABAC encoding apparatus 1 can supply two pieces of redefined binary code binA per cycle to the arithmetic encoder 3 as transmission binary code binCA. Since the CABAC encoding apparatus 1 can eliminate remaining of transmission binary code binCA within the binary encoder 2, it is possible to make maximum use of the binary encoding capacity of the binary encoding section 22.

1-2. Configuration of CABAC Decoding Apparatus

As shown in FIG. 4, a CABAC decoding apparatus 50 includes an arithmetic decoder 52, a binary decoder 53, and a transmission path 54 connecting between the arithmetic decoder 52 and the binary decoder 53. The CABAC decoding apparatus 50 executes a CABAC decoding process in accordance with the H.264/AVC standard.

The arithmetic decoder 52 converts a bit stream supplied from an external device into transmission binary code binCA, and supplies the transmission binary code binCA to the binary decoder 53. Like the transmission path 4 (FIG. 1), the transmission path 54 can transmit 32 pieces (bits) of data in one cycle (clock cycle). The arithmetic decoder 52 performs arithmetic decoding on the bit stream, generating binary code bin.

Among pieces of binary code bin, the arithmetic decoder 52 of the CABAC decoding apparatus 50 redefines to-be-redefined binary code binU corresponding to the kind of syntax information encoded in UEGk. Thus, the arithmetic decoder 52 supplies to-be-redefined binary code binU generated as a result of an arithmetic decoding process to the binary decoder 53 as redefined binary code binA. At this time, the arithmetic decoder 52 generates redefined binary code binA in such a way that every piece of redefined binary code binA has a length of no more than 16 (bits) equal to half the transmission capacity of the transmission path 54, which is 32 (bits).

Specifically, upon supply of a bit stream from an external device, the arithmetic decoder 52 supplies the bit stream to an arithmetic decoding section 62. The arithmetic decoding section 62 performs arithmetic decoding on the bit stream to sequentially generate binary code bin, and supplies the generated binary code bin to a syntax information determining section 61 and a bin conversion section 64.

The syntax information determining section 61 determines the kind of syntax information corresponding to binary code bin from the order of the binary code bin. If the syntax information corresponding to the binary code bin is motion vector information mvd_lx or a coefficient absolute value coeff_abs_level_minus1, the syntax information determining section 61 supplies a redefinition selection control signal to a bin conversion section 64 and a selecting section 65.

The bin conversion section 64 redefines to-be-redefined binary code binU in accordance with a redefinition selection control signal in such a way as to ensure that two pieces of the to-be-redefined binary code binU can be sent in one cycle via the transmission path 54, thereby generating redefined binary code binA of no more than 16 (bits) that is ½ of the transmission capacity of the transmission path 54. The bin conversion section 64 supplies the generated binary code binA to the selecting section 65.

As a result, binary code bin (each of normal binary code binC and to-be-redefined binary code binU) and redefined binary code binA are supplied to the selecting section 65 from the arithmetic decoding section 62 and the bin conversion section 64, respectively. If a redefinition selection control signal is supplied from the syntax information determining section 61, the selecting section 65 recognizes the binary code bin supplied from the arithmetic decoding section 62 as being to-be-redefined binary code binU, and supplies redefined binary code binA as transmission binary code binCA to the arithmetic decoder 53 via the transmission path 54.

On the other hand, if a redefinition selection control signal is not supplied from the syntax information determining section 61, the selecting section 65 recognizes the binary code bin supplied from the arithmetic decoding section 62 as being normal binary code binC, and supplies the normal binary code binC as transmission binary code binCA to the arithmetic decoder 53 via the transmission path 54.

A buffer (not shown) is provided in the transmission path 54. Transmission binary code binCA is temporarily held in this buffer. Upon supply of transmission binary code binCA from the buffer via the transmission path 54, the binary decoder 53 supplies this transmission binary code binCA to a bin inverse conversion section 72 and a selecting section 73. The bin inverse conversion section 72 performs an inverse conversion on redefined binary code binA in accordance with a redefinition selection signal supplied from a syntax information determining section 71, generating to-be-redefined binary code binU, and then supplies this to-be-redefined binary code binU to the selecting section 73. As a result, transmission binary code binCA (each of normal binary code binC and redefined binary code binA) and to-be-redefined binary code binU are supplied to the selecting section 73.

If a redefinition selection control signal is not supplied from the syntax information determining section 71, the selecting section 73 recognizes the transmission binary code binCA supplied from the arithmetic decoder 52 as being normal binary code binC, and supplies the normal binary code binC to a binary decoding section 75 as reproduced binary code binR.

If a redefinition selection control signal is supplied, the selecting section 73 recognizes that redefined binary code binA has been supplied from the arithmetic decoder 52, and outputs the to-be-redefined binary code binU supplied from the bin inverse conversion section 72 to the binary decoding section 75 as reproduced binary code binR.

Upon supply of the reproduced binary code binR, the binary decoding section 75 decodes this binary code bin to generate syntax information, and supplies this syntax information to an external device (not shown) and the syntax information determining section 71.

The syntax information determining section 71 determines the kind of the next transmission binary code binCA from the order of the syntax information, and if the next transmission binary code binCA supplied from the arithmetic decoder 52 is recognized as being redefined binary code binA corresponding to motion vector information mvd_lx or a coefficient absolute value coeff_abs_level_minus1, the syntax information determining section 71 supplies a redefinition selection control signal to the selecting section 73.

In this way, the CABAC decoding apparatus 50 generates transmission binary code binCA by taking into account the processing speed of the binary decoding section 75 capable of decoding two pieces of to-be-redefined binary code binU per cycle, and the transmission capacity of the transmission path 54 capable of transmitting 32 pieces (bits) of data per cycle.

Since the CABAC decoding apparatus 50 can thus ensure that two pieces of transmission binary code binCA be supplied per cycle from the buffer to the binary decoder 53 with respect to redefined binary code binA, it is possible to make maximum use of the binary encoding capacity of the binary decoding section 75.

1-3. Generation of Redefined Binary Code BinA

Next, generation of redefined binary code binA will be described.

As shown in FIG. 2, motion vector information mvd_lx is converted by the binary encoding section 22 into to-be-redefined binary code binU that is a variable-length code. As shown in FIGS. 5A to 5D, to-be-redefined binary code binU with respect to motion vector information mvd_lx (hereinafter, this will be referred to as to-be-redefined motion binary code binUm) has a prefix PFX in TU in the first half portion, a suffix SFX in exponential Golomb, and a sign PM.

As shown in FIGS. 5A to 5D, the prefix PFX is an element in TU, and its number of digits varies with the value of motion vector information mvd_lx. When the value of motion vector information mvd_lx is not larger than "8", the tail of the prefix PFX is "0", and the portion other than the tail is "1". When the value of motion vector information mvd_lx is "9" or more, the prefix PFX is represented as nine digits of "1"s.

The suffix SFX is an element in exponential Golomb, and has as its sub-elements a Golomb prefix GPX, a separator SP, and a Golomb suffix GSX.

The Golomb prefix GPX indicates the number of digits of the Golomb suffix GSX. The number of digits of the Golomb suffix GSX is indicated by the number of successive "1"s from the beginning of the suffix SFX (that is, after the prefix PFX represented by nine digits of "1"s).

The Golomb suffix GSX is arranged in the second half portion of the suffix SFX, indicates the absolute value of motion vector information mvd_lx in accordance with its number of digits and absolute value, and takes an arbitrary value. In the drawings, the Golomb suffix GSX is represented by "X" that takes a value "0" or "1". The separator SP indicates the start of the Golomb suffix GSX, and is the first "0" that appears in the suffix SFX.

The sign PM is an element indicating positive or negative by "0" or "1", and is added to the last digit of binary code bin. In the drawings, the sign PM is represented as "S". To-be-redefined motion binary code binUm indicates the value of motion vector information mvd_lx by the presence/absence and combination of these individual elements and sub-elements.

For example, as shown in FIG. 5A, if the absolute value of motion vector information mvd_lx is "0", to-be-redefined motion binary code binUm is made up of only the prefix PFX, with the suffix SFX and the sign PM omitted.

As shown in FIG. 5B, if the absolute value of motion vector information mvd_lx ranges from "2" to "8", to-be-redefined motion binary code binUm is made up of only the prefix PFX and the sign PM, with the suffix SFX omitted. At this time, since the number of digits of the prefix PFX is not larger than "9", the to-be-redefined motion binary code binUm indicates that the number of digits of the Golomb suffix GSX="0", and the number of digits of the prefix PFX indicates the absolute value of motion vector information mvd_lx.

As shown in FIGS. 5C and 5D, if the absolute value of motion vector information mvd_lx is "9" or more, to-be-redefined motion binary code binUm is made up of the prefix PFX, the suffix SFX, and the sign PM. The presence of "nine" "1"s in the prefix PFX indicates the presence of the suffix SFX. In addition, in the suffix SFX, the number of "1"s in the Golomb prefix GPX indicates the number of digits of the Golomb suffix GSX.

As shown in FIG. 5C, the omission of the Golomb prefix GPX and the presence of the separator SP "0" at the beginning of the suffix SFX indicates that the number of digits of the Golomb suffix GSX="3" digits. The Golomb suffix GSX indicates that the absolute value of motion vector information mvd_lx is "9 to 16" by its number of digits, and indicates the absolute value of motion vector information mvd_lx by its value.

As shown in FIG. 5D, the succession of two "1"s at the beginning of the suffix SFX (that is, after the nine digits of "1"s in the prefix PFX) indicates that the number of digits of the Golomb suffix GSX="5" digits. The Golomb suffix GSX indicates that the absolute value of motion vector information mvd_lx is "33 to 64" by its number of digits, and indicates the absolute value of motion vector information mvd_lx by its value.

In other words, in to-be-redefined motion binary code binUm, if the absolute value of motion vector information mvd_lx is "8" or less, the prefix PFX indicates that absolute value, and also indicates the absence of the Golomb suffix GSX. If the absolute value of motion vector information mvd_lx is "9" or more, the prefix PFX indicates the presence of the Golomb suffix. The Golomb suffix GSX indicates the value of syntax information by its number of digits and value. The separator SP indicates the start position of the Golomb suffix GSX. The Golomb prefix GPX indicates the number of digits of the Golomb suffix GSX. The sign PM indicates a sign. To-be-redefined motion binary code binUm indicates the value of syntax information by the presence/absence and combination of these elements.

As shown in FIGS. 6A to 6D, from to-be-redefined binary code binU, redefined binary code binA with respect to motion vector information mvd_lx (hereinafter, this will be referred to as redefined motion binary code binAm) is generated by the bin conversion sections 24 and 64.

As shown in the right part of FIG. 2, redefined motion binary code binAm is represented as a variable-length code for portions in which the absolute value of motion vector information mvd_lx is "0 to 8", and the bit length of the corresponding to-be-redefined motion binary code binUm is relatively small at 10 bits or less. Redefined motion binary code binAm is represented as a fixed-length code of 16 bits for portions in which the bit length of the corresponding to-be-redefined motion binary code binUm is relatively large at 14 bits or more.

Redefined motion binary code binAm indicates the absolute value of motion vector information mvd_lx="16384" if the absolute value of the motion vector information mvd_lx is larger than a rounding threshold "16384". That is, for redefined motion binary code binAm, absolute values of motion vector information mvd_lx larger than the rounding threshold "16384" are regarded as being "16384". As a result, although redefined motion binary code binAm is subject to an error with respect to absolute values of motion vector information mvd_lx larger than "16384", since the frequency of appearance of such values is extremely small, there is hardly any degradation in image quality due to such an error.

In this way, redefined motion binary code binAm can represent all the values of motion vector information mvd_lx in 16 bits or less.

As shown in FIGS. 6A and 6B, for portions in which the absolute value of motion vector information mvd_lx is "0 to 8", to-be-redefined motion binary code binUm is converted into redefined motion binary code binAm by adding "1" to the beginning of the to-be-redefined motion binary code binUm as a leading mark HM.

Thus, redefined motion binary code binAm can be made to begin with a symbol "1" without causing any overlapping of values. That is, redefined motion binary code binAm can indicate that the redefined motion binary code binAm concerned is a variable-length code by the presence of "1" at the beginning.

As shown in FIGS. 6C and 6D, for portions in which the absolute value of motion vector information mvd_lx is "9" or more, redefined motion binary code binAm uses "1" that is a symbol opposite to the symbol of the separator SP, as an opposite separator SPK indicating the start of the Golomb suffix GSX. In redefined motion binary code binAm, the Golomb suffix GSX and the sign PM are placed at the end, the opposite separator SPK is placed immediately before the Golomb suffix GSX, and a leading-zeros portion HZ is placed by filling "0"s in a portion of the redefined motion binary code binAm before the opposite separator SPK from the beginning. This leading-zeros portion HZ is set to a number of bits equal to 16 bits as a fixed length, minus the number of added bits equal to the number of bits of the Golomb suffix GSX and the number of bits of additional elements and sub-elements such as the separator SP and the sign PM.

Since every piece of to-be-redefined motion binary code binUm has a different number of digits of the Golomb suffix GSX, in redefined motion binary code binAm, the number of successive zeros in the leading-zeros portion HZ can be varied with the number of digits of the Golomb suffix GSX, thereby preventing any overlapping of values.

Thus, redefined motion binary code binAm can indicate that the redefined motion binary code binAm concerned is a fixed-length code of 16 bits by the presence of a symbol "0" at the beginning. Further, redefined motion binary code binAm can indicate the start position of the Golomb suffix GSX by the opposite separator SPK, and the end position of the Golomb suffix GSX by its fixed length.

A coefficient absolute value coeff_abs_level_minus1 is converted by the binary encoding section 22 into to-be-redefined binary code binU of a variable length. As shown in FIGS. 7A to 7D, to-be-redefined binary code binU with respect to a coefficient absolute value coeff_abs_level_minus1 (hereinafter, this will be referred to as to-be-redefined coefficient binary code binUc) has the suffix SFX, and the prefix PFX as its elements.

That is, to-be-redefined coefficient binary code binUc is the same as to-be-redefined motion binary code binUm except for the following features. To-be-redefined coefficient binary code binUc does not have the sign PM as its element. To-be-redefined coefficient binary code binUc differs from to-be-redefined motion binary code binUm in the relationship between the number of "1"s in the prefix PFX, the number of digits of the Golomb suffix GSX, and the absolute value of a coefficient absolute value coeff_abs_level_minus1. It should be noted that since the roles of the respective elements in to-be-redefined coefficient binary code binUc are the same as those in to-be-redefined motion binary code binUm, description thereof is omitted.

For example, as shown in FIGS. 7A and 7B, if the absolute value of a coefficient absolute value coeff_abs_level_minus1 is "0 to 14", to-be-redefined coefficient binary code binUc is made up of only the prefix PFX, with the suffix SFX omitted.

As shown in FIG. 7C, if the absolute value of a coefficient absolute value coeff_abs_level_minus1 is "15 to 16", to-be-redefined coefficient binary code binUc is made up of the prefix PFX and the suffix SFX. At this time, the SFX is made up of the separator SP and the Golomb suffix GSX, with the Golomb prefix GPX omitted.

As shown in FIG. 7D, if the absolute value of a coefficient absolute value coeff_abs_level_minus1 is "17" or more, to-be-redefined coefficient binary code binUc is made up of the prefix PFX and the suffix SFX. At this time, the SFX is made up of the Golomb prefix GPX, the separator SP, and the Golomb suffix GSX.

As shown in FIGS. 8A to 8D, to-be-redefined binary code binU is converted into redefined binary code binA with respect to a coefficient absolute value coeff_abs_level_minus1 (hereinafter, this will be referred to as redefined coefficient binary code binAc) by the bin conversion sections 24 and 64.

As shown in the right part of FIG. 3, redefined coefficient binary code binAc is represented as a variable-length code for portions in which the absolute value of a coefficient absolute value coeff_abs_level_minus1 is "1 to 13", and the bit length of the corresponding to-be-redefined coefficient binary code binUc is relatively small at 14 bits or less. Redefined coefficient binary code binAc is represented as a fixed-length code of 16 bits for portions in which the bit length of the corresponding to-be-redefined coefficient binary code binUc is relatively large at 15 bits or more.

Redefined coefficient binary code binAc indicates that the absolute value of a coefficient absolute value coeff_abs_level_minus1="32780" if the absolute value of the coefficient absolute value coeff_abs_level_minus1 is larger than a rounding threshold "32780". That is, for redefined coefficient binary code binAc, absolute values of a coefficient absolute value coeff_abs_level_minus1 larger than the rounding threshold "32780" are regarded as being "32780".

In this way, redefined coefficient binary code binAc can represent all the values of a coefficient absolute value coeff_abs_level_minus1 in 16 bits or less.

As shown in FIGS. 8A and 8B, for portions in which the absolute value of a coefficient absolute value coeff_abs_level_minus1 is "0 to 13", by adding "1" to the beginning of to-be-redefined coefficient binary code binUc as a leading mark HM, redefined coefficient binary code binAc is generated.

Thus, redefined coefficient binary code binAc can be made to begin with a symbol "1" without causing any overlapping of values. That is, redefined coefficient binary code binAc can indicate that the redefined coefficient binary code binAc concerned is a variable-length code by the presence of "1" at the beginning.

As shown in FIGS. 8C and 8D, for portions in which the absolute value of a coefficient absolute value coeff_abs_level_minus1 is "14" or more, redefined coefficient binary code binAc uses "1" that is a symbol opposite to the symbol of the separator SP, as the opposite separator SPK indicating the start of the Golomb suffix GSX. In redefined coefficient binary code binAc, the Golomb suffix GSX is placed at the end, the opposite separator SPK is placed immediately before the Golomb suffix GSX, and the leading-zeros portion HZ is placed by filling "0"s in the portion of the redefined coefficient binary code binAc before the opposite separator SPK from the beginning. This leading-zeros portion HZ is set to a number of bits equal to 16 bits as a fixed length, minus the number of added bits equal to the number of bits of the Golomb suffix GSX and the number of bits of the separator SP as an additional element.

It should be noted that if the absolute value of a coefficient absolute value coeff_abs_level_minus1 is "14", redefined coefficient binary code binAc realizes a fixed length of 16 bits without the Golomb suffix GSX by the opposite separator SPK placed at the end.

Since every piece of to-be-redefined coefficient binary code binUc has a different number of digits of the Golomb suffix GSX, in redefined coefficient binary code binAc, the number of successive zeros in the leading-zeros portion HZ can be varied with the number of digits of the Golomb suffix GSX, thereby preventing any overlapping of values.

Thus, redefined coefficient binary code binAc can indicate that the redefined coefficient binary code binAc concerned is a fixed-length code of 16 bits by the presence of a symbol "0" at the beginning. Further, redefined coefficient binary code binAc can indicate the start position of the Golomb suffix GSX by the opposite separator SPK, and the end position of the Golomb suffix GSX by its fixed length.

Specifically, as shown in FIGS. 2 and 3, the bin conversion sections 24 and 64 have a conversion table associating to-be-redefined binary code binU with redefined binary code binA.

Upon supply of to-be-redefined binary code binU, the bin conversion sections 24 and 64 select redefined binary code binA corresponding to the to-be-redefined binary code binU in accordance with the conversion table.

If the to-be-redefined binary code binU is to-be-redefined motion binary code binUm, the bin conversion sections 24 and 64 replace the sign PM represented by "S" in the selected redefined binary code binA with the sign PM in the to-be-redefined binary code binU.

If the to-be-redefined binary code binU has the Golomb suffix GSX, the bin conversion sections 24 and 64 replace the Golomb suffix GSX represented by "X" in the selected redefined binary code binA with the Golomb suffix GSX in the to-be-redefined binary code binU.

If the to-be-redefined binary code binU does not have the Golomb suffix GSX, the bin conversion sections 24 and 64 output the selected redefined binary code binA as it is as redefined binary code binA.

Likewise, the bin inverse conversion sections 32 and 72 also have an inverse conversion table associating to-be-redefined binary code binU with redefined binary code binA.

Upon supply of redefined binary code binA, the bin inverse conversion sections 32 and 72 select to-be-redefined binary code binU corresponding to the redefined binary code binA in accordance with the inverse conversion table.

If the redefined binary code binA is to-be-redefined motion binary code binUm, the bin inverse conversion sections 32 and 72 replace the sign PM in the selected to-be-redefined motion binary code binUm with the sign PM in the redefined binary code binA.

If the redefined binary code binA has the Golomb suffix GSX, the bin inverse conversion sections 32 and 72 replace the Golomb suffix GSX represented in the selected to-be-redefined binary code binU with the Golomb suffix GSX in the redefined binary code binA.

If the redefined binary code binA does not have the Golomb suffix GSX, the bin inverse conversion sections 32 and 72 output the selected to-be-redefined binary code binU as reproduced binary code binR as it is.

In this way, the CABAC encoding apparatus 1 and the CABAC decoding apparatus 50 encode portions of to-be-redefined binary code binU with large number of bits in fixed length, thereby generating redefined binary code binA of which all the values are 16 bits or less in length.

It should be noted that the series of CABAC encoding and CABAC decoding processes described above can be executed by either hardware or software. If the CABAC encoding and CABAC decoding processes are to be implemented by software, the CABAC encoding apparatus 1 and the CABAC decoding apparatus 50 are virtually formed in a CPU or RAM. Then, by expanding a CABAC encoding program and a CABAC decoding program stored on a ROM onto a RAM, the CABAC encoding and CABAC decoding processes are executed.

1-4. Procedure

[1-4-1. CABAC Encoding Procedure]

Figure 9:
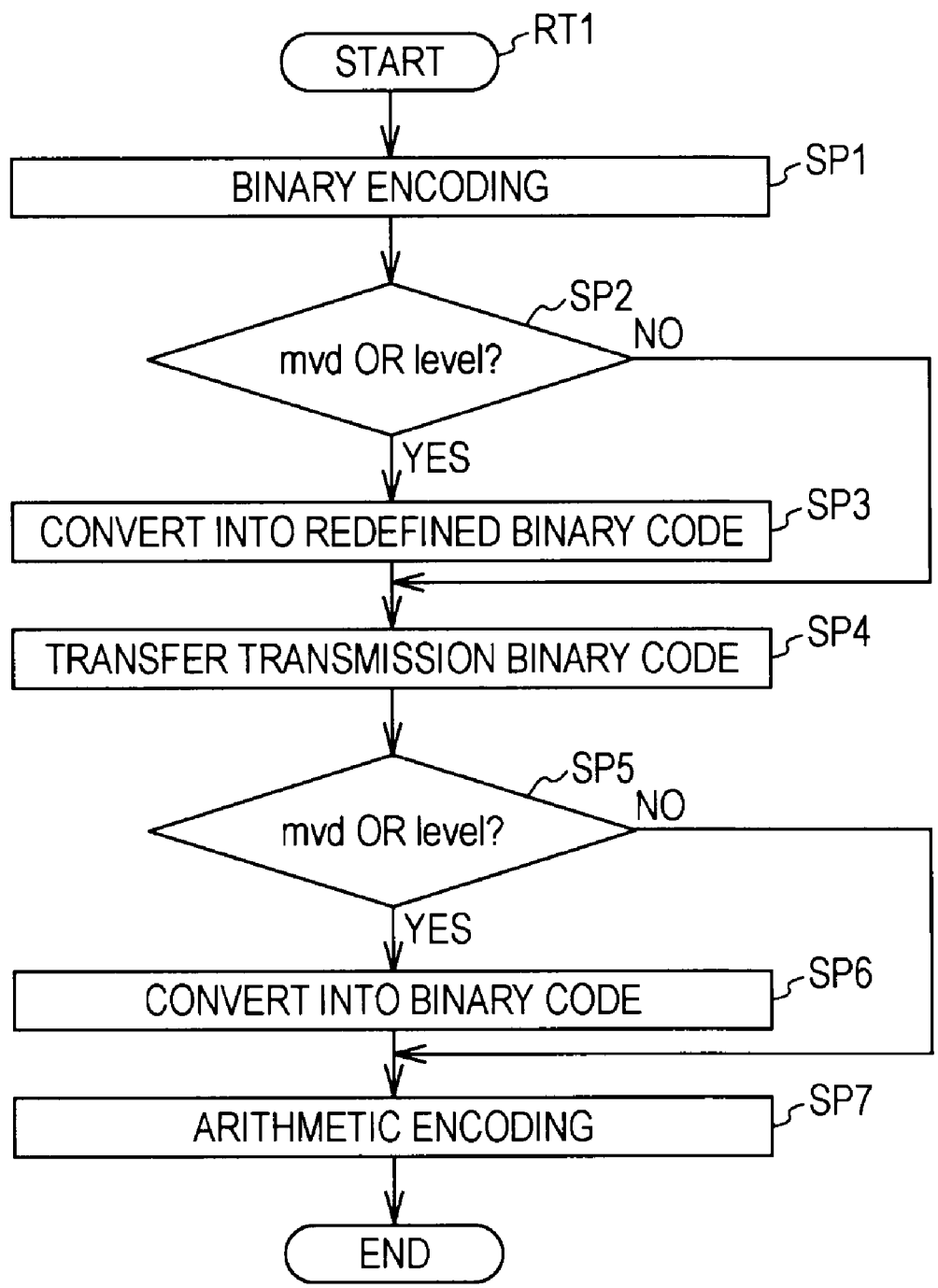
FIG. 9 is a flowchart for explaining a CABAC encoding procedure.

Next, a CABAC encoding procedure RT1 executed in accordance with a CABAC encoding program will be described with reference to the flowchart in FIG. 9.

Upon supply of syntax information from an external device, the CABAC encoding apparatus 1 starts the CABAC encoding procedure RT1, and transfers to step SP1.

In step SP1, the CABAC encoding apparatus 1 encodes the syntax information in binary to generate binary code bin, and then transfers to the next step SP2.

In step SP2, the CABAC encoding apparatus 1 judges whether or not the binary code bin corresponds to motion vector information mvd_lx or a coefficient absolute value coeff_abs_level_minus1.

If a negative result is obtained at this time, this indicates that the binary code bin is normal binary code binC, and redefinition is unnecessary. At this time, the CABAC encoding apparatus 1 transfers to the next step SP4.

On the other hand, if a positive result is obtained in step SP2, this indicates that the binary code bin is to-be-redefined binary code binU, and it may not be possible to transfer pieces of to-be-redefined binary code binU corresponding to at least two pieces of syntax information simultaneously via the transmission path 4. At this time, the CABAC encoding apparatus 1 transfers to the next step SP3.

In step SP3, the CABAC encoding apparatus 1 converts the to-be-redefined binary code binU into redefined binary code binA, and then transfers to the next step SP4.

In step SP4, the CABAC encoding apparatus 1 transfers transmission binary code binCA (each of normal binary code binC and to-be-redefined binary code binU) from the binary encoder 2 to the arithmetic encoder 3 via the transmission path 4, and then transfers to step SP5.

In step SP5, the CABAC encoding apparatus 1 judges whether or not the transmission binary code binCA corresponds to motion vector information mvd_lx or a coefficient absolute value coeff_abs_level_minus1.

If a negative result is obtained at this time, this indicates that the transmission binary code binCA is normal binary code binC. At this time, the CABAC encoding apparatus 1 transfers to the next step SP7.

On the other hand, if a positive result is obtained in step SP5, this indicates that the transmission binary code binCA is redefined binary code binA. At this time, the CABAC encoding apparatus 1 transfers to the next step SP6.

In step SP6, the CABAC encoding apparatus 1 converts the redefined binary code binA into to-be-redefined binary code binU, and then transfers to the next step SP7.

In step SP7, the CABAC encoding apparatus 1 applies arithmetic encoding to reproduced binary code binR (each of normal binary code binC and reproduced to-be-redefined binary code binU), and then transfers to an ending step to end the processing.

[1-4-2. CABAC Decoding Procedure]

Figure 10:
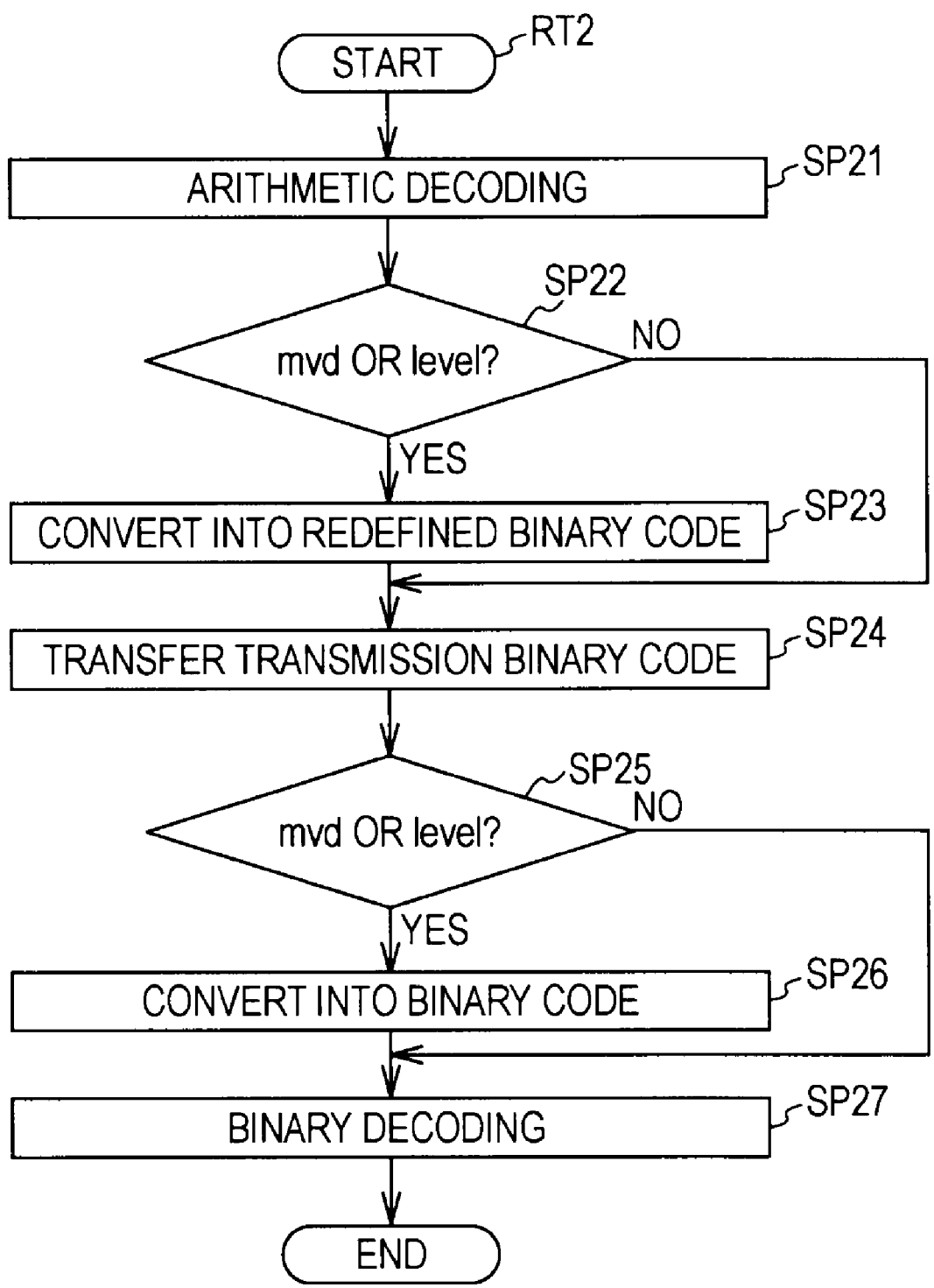
FIG. 10 is a flowchart for explaining a CABAC decoding procedure.

Next, a CABAC decoding procedure RT2 executed in accordance with a CABAC decoding program will be described with reference to the flowchart in FIG. 10.

Upon supply of a bit stream from an external device, the CABAC decoding apparatus 50 starts the CABAC decoding procedure RT2, and transfers to step SP21.

In step SP21, the CABAC decoding apparatus 50 applies arithmetic encoding to the bit stream to generate binary code bin, and then transfers to the next step SP22.

In step SP22, the CABAC decoding apparatus 50 judges whether or not the binary code bin corresponds to motion vector information mvd_lx or a coefficient absolute value coeff_abs_level_minus1.

If a negative result is obtained at this time, this indicates that the binary code bin is normal binary code binC, and redefinition is unnecessary. At this time, the CABAC decoding apparatus 50 transfers to the next step SP23.

On the other hand, if a positive result is obtained in step SP22, this indicates that the binary code bin is to-be-redefined binary code binU, and it may not be possible to transfer at least two pieces of to-be-redefined binary code binU simultaneously via the transmission path 54. At this time, the CABAC decoding apparatus 50 transfers to the next step SP23.

In step SP23, the CABAC decoding apparatus 50 converts the to-be-redefined binary code binU into redefined binary code binA, and then transfers to the next step SP24.

In step SP24, the CABAC decoding apparatus 50 transfers transmission binary code binCA (each of normal binary code binC and to-be-redefined binary code binU) from the arithmetic decoder 52 to the binary decoder 53 via the transmission path 54, and then transfers to step SP25.

In step SP25, the CABAC decoding apparatus 50 judges whether or not the transmission binary code binCA corresponds to motion vector information mvd_lx or a coefficient absolute value coeff_abs_level_minus1.

If a negative result is obtained at this time, this indicates that the transmission binary code binCA is normal binary code binC. At this time, the CABAC decoding apparatus 50 transfers to the next step SP27.

On the other hand, if a positive result is obtained in step SP25, this indicates that the transmission binary code binCA is redefined binary code binA. At this time, the CABAC decoding apparatus 50 transfers to the next step SP26.

In step SP26, the CABAC decoding apparatus 50 inversely converts the redefined binary code binA into to-be-redefined binary code binU, and then transfers to the next step SP27.

In step SP27, the CABAC decoding apparatus 50 decodes reproduced binary code binR (normal binary code binC and reproduced to-be-redefined binary code binU) in binary, and then transfers to an ending step to end the processing.

1-5. Operation and Effect

According to the configuration described above, the CABAC encoding apparatus 1 as an encoding apparatus receives syntax information defined by an encoding standard, and applies encoding (binary encoding) to the syntax information to generate binary code bin as encoded information. The CABAC encoding apparatus 1 transfers transmission binary code binCA as transmission encoded information based on the binary code bin via the transmission path 4, and applies encoding (arithmetic encoding) to reproduced binary code binR reproduced from the transmission binary code binCA supplied via the transmission path 4.

The CABAC encoding apparatus 1 converts the binary-encoded binary code bin into redefined binary code binA as redefined encoded information. At this time, the CABAC encoding apparatus 1 generates transmission binary code binCA according to the transfer capacity of the transmission path 4 and the processing speed of binary encoding in the binary encoding section 22, so that no delay occurs in the binary encoding process in the binary encoding section 22 serving as a first encoding section. The CABAC encoding apparatus 1 applies inverse conversion to the redefined binary code binA to generate reproduced binary code binR.

Since the CABAC encoding apparatus 1 can thus transfer the reproduced binary code binR at an appropriate speed, it is possible to prevent delay in binary encoding due to remaining of binary code bin within the binary encoder 2.

The configuration of the CABAC encoding apparatus 1 can be simplified because it is unnecessary to make the width of the transmission path 4 large, and also it is unnecessary to provide a buffer for saving binary code bin within the binary encoder 2 in order to compensate for a delay in transfer of binary code bin. For example, in the case of providing a buffer within the binary encoder 2 in the CABAC encoding apparatus 1, taking the number of times a coefficient absolute value coeff_abs_level_minus1 is supplied successively into account, a very large capacity is necessary for the buffer. In the case of increasing the width of the transmission path 4 in accordance with binary code bin, taking the number of bits (see, for example, FIG. 3) of the binary code bin into account, a width of at least 86 bits (43 bits×2) is necessary.

The CABAC encoding apparatus 1 generates transmission binary code binCA so that a number of pieces of syntax information (that is, "2" at maximum) corresponding to pieces of binary code binU processed during one cycle by one of the binary encoding section 22 and the arithmetic encoding section 35, i.e., the binary encoding section 22, can be transferred in one cycle via the transmission path 4. The CABAC encoding apparatus 1 sets the data length of each individual piece of transmission binary code binCA to be equal to or less than a divided value (16 bits) obtained by dividing the transmission capacity (32 bits) of the transmission path 4 per cycle by the number of pieces of syntax information corresponding to pieces of binary code binU processed by the binary encoding section 22 in one cycle.

Consequently, since the CABAC encoding apparatus 1 can transfer pieces of transmission binary code binCA corresponding to at least two pieces of syntax to the arithmetic encoding section 35 per cycle, it is possible to make maximum use of the processing capacity of the binary encoding section 22 without causing a delay in its processing. As a result, the CABAC encoding apparatus 1 makes it possible to improve the processing speed of the binary encoder 2.

The CABAC encoding apparatus 1 converts to-be-redefined binary code binU, which is information to be redefined into redefined binary code binA, of the binary code bin encoded by the binary encoding section 22 serving as a first encoding section, into the redefined binary code binA so as to make at least part of the to-be-redefined binary code binU have a fixed length of 16 bits or less. The CABAC encoding apparatus 1 converts a portion of the to-be-redefined binary code binU with a large data length into redefined binary code binA of a fixed length.

Thus, the CABAC encoding apparatus 1 allows combination of variable and fixed lengths for redefined binary code binA, thereby making it possible to effectively restrict the data length of the redefined binary code binA.

The CABAC encoding apparatus 1 regards the value of to-be-redefined binary code binU as being equal to a rounding threshold if the value of the to-be-redefined binary code binU is larger than the rounding threshold.

Consequently, the CABAC encoding apparatus 1 can generate redefined binary code binA within the constraint of a limited code length of 16 bits while discarding portions that have little influence on image quality.

The CABAC encoding apparatus 1 converts a portion of to-be-redefined binary code binU having a small data length into redefined binary code binA of a variable length by adding the leading mark HM represented by a symbol "1" different from the symbol of the separator SP to the beginning of the to-be-redefined binary code binU.

Consequently, the CABAC encoding apparatus 1 can make every piece of redefined binary code binA of a variable length to begin with "1", thereby making it possible to indicate that the redefined binary code binA concerned has a variable length.

The CABAC encoding apparatus 1 converts a portion of to-be-redefined binary code binU having a large data length into redefined binary code binA having the following sub-elements. The sub-elements include the Golomb suffix GSX, the opposite separator SPK indicating the start position of the Golomb suffix GSX and represented by a symbol opposite to the symbol of the separator SP, and the leading-zeros portion HZ as a leading-opposite-symbols portion including symbols opposite to the symbol of the opposite separator SPK and placed before the opposite separator SPK, the leading-zeros portion having a number of digits equal to a fixed length minus the number of digits added in accordance with the number of digits of the Golomb suffix GSX.

Consequently, since the CABAC encoding apparatus 1 can generate redefined binary code binA by using the Golomb suffix GSX as it is, the configuration of the bin conversion section 24 can be simplified.

The CABAC encoding apparatus 1 selects corresponding redefined binary code binA from to-be-redefined binary code binU by using a conversion table. If the to-be-redefined binary code binU has the Golomb suffix GSX, the CABAC encoding apparatus 1 replaces the Golomb suffix GSX in the redefined binary code binA by the Golomb suffix GSX in the to-be-redefined binary code binU to convert the to-be-redefined binary code binU into the redefined binary code binA. If the to-be-redefined binary code binU has the sign PM, the CABAC encoding apparatus 1 replaces the sign PM in the redefined binary code binA with the sign PM in the to-be-redefined binary code binU.

Consequently, since it is not necessary for the CABAC encoding apparatus 1 to have a conversion table containing values corresponding to all the possible values of to-be-redefined binary code binU, the processing load caused by consulting the conversion table is reduced, and the storage capacity necessary for holding the conversion table can be significantly reduced.

According to the above-described configuration, in the CABAC encoding process executed in two separate stages, the CABAC encoding apparatus 1 generates transmission binary code binCA to be transferred via the transmission path 4. The CABAC encoding apparatus 1 converts binary code bin into transmission binary code binCA before the transmission path 4, and reproduces the transmission binary code binCA into reproduced binary code binR before the arithmetic encoding section 35. The CABAC encoding apparatus 1 generates the transmission binary code binCA in such a way as not to cause delay in the processing in the binary encoding section 22, by taking into account the transmission capacity of the transmission path 4 and the processing speed of the binary encoding section 22.

Consequently, in the CABAC encoding apparatus 1, a waiting time for the transfer of binary code bin does not arise due to insufficient transmission capacity of the transmission path 4. It is thus possible to make maximum use of the processing capacity of the binary encoding section 22, and make the processing of the binary encoding section 22 faster.

2. Other Embodiments

It should be noted that the embodiment described above is directed to the case in which a portion of to-be-redefined binary code binU having a large data length is converted into redefined binary code binA with a fixed length of 16 bits. The present invention is not limited to this. There are no limitations on the length of the fixed length. For example, as shown in FIGS. 11 and 12, such a portion may be converted into redefined binary code binA with a fixed length of 15 bits.

In addition, the embodiment described above is directed to the case in which the transmission capacity of the transmission path 4 is 32 bits per cycle, and the processing speed of the binary encoding section 22 is such that pieces of to-be-redefined binary code binU corresponding to two pieces of syntax information can be generated in one cycle. The present invention is not limited to this. There are no limitations on the values of the transmission capacity (i.e., the bit width of the transmission path) and processing speed (i.e., the number of pieces of syntax that can be processed in one cycle). In addition, the data length of each individual piece of transmission binary code binCA may not necessarily be set equal to or less than a value obtained by dividing the transmission capacity by the processing speed of the encoding section (such as the binary encoding section 22) or the decoding section (such as the binary decoding section 75).

Further, the embodiment described above is directed to the case in which the present invention is applied to the CABAC encoding apparatus 1 having the binary encoding section 22 and the arithmetic encoding section 35. The present invention is not limited to this. The present invention can be applied to any encoding apparatus in which two encodings are executed successively via a transmission path.

Further, the embodiment described above is directed to the case of preventing delay from occurring in the binary encoding process in the binary encoding section 22 serving as a first encoding section. The present invention is not limited to this. Delay may be prevented from occurring in the arithmetic encoding process in the arithmetic encoding section 35 serving as a second encoding section. The bottom line is that it is possible to attain the effect of the present invention by preventing delay from occurring in one of the encoding sections or decoding sections.

Further, the embodiment described above is directed to the case in which the arithmetic encoder 3 has a buffer. The present invention is not limited to this. For example, no buffer is necessary if the arithmetic encoding section 35 is capable of executing an arithmetic encoding process at a sufficiently high speed. In this case, according to an embodiment of the present invention, for example, to prevent delay from occurring in the arithmetic encoding process in the arithmetic encoding section, transmission binary code binCA is supplied without interruption from the binary encoder 2 in accordance with the processing speed of the arithmetic encoding process. In this way, the present invention makes it possible to make maximum use of the processing capacity of the arithmetic encoding section 35, thereby increasing the overall processing speed for the arithmetic encoding process and CABAC encoding process. In this case, for example, if the number of successive pieces of to-be-redefined binary code binU is "4", and the immediately preceding normal binary code binC is 4 bits or less in length, 28 bits worth of transmission binary code binCA can be transferred together with the immediately preceding binary code binC. Thus, by making the data length of redefined binary code binA to 23 bits or less, delay in the binary encoding section 22 can be prevented. The present invention makes it possible to select the data length of redefined binary code binA as appropriate, insofar as no delay occurs in the processing of the encoding section or decoding section in relation to the number of pieces of to-be-redefined binary code binU and the preceding and succeeding pieces of normal binary code binC.

Further, the embodiment described above is directed to the case in which a buffer is provided between the arithmetic decoder 52 and the binary decoder 53. The present invention is not limited to this. For example, no buffer is necessary if the arithmetic decoding section 62 is capable of executing an arithmetic decoding process at a sufficiently high speed.

Further, the embodiment described above is directed to the case in which the binary encoding section 22 binarizes two pieces of syntax information in one cycle, with respect to the kind of syntax information corresponding to to-be-redefined binary code binU. The present invention is not limited to this. The binary encoding section 22 may binarize two pieces of syntax information in one cycle with respect to, for example, all kinds of syntax information. In addition, the present invention may use syntax information other than motion vector information mvd_lx or a coefficient absolute value coeff_abs_level_minus1 as to-be-redefined binary code binU.

Further, the embodiment described above is directed to the case of preventing delay from occurring in the arithmetic decoding process in the arithmetic decoding section 62 serving as a first decoding section. The present invention is not limited to this. Delay may be prevented from occurring in the binary decoding process in the binary decoding section 75 serving as a second decoding section. The bottom line is that it is possible to attain the effect of the present invention by preventing delay from occurring in one of the decoding sections with the lower processing speed.

Further, the embodiment described above is directed to the case in which a portion of to-be-redefined binary code binU with a large data length is converted into redefined binary code binA of a fixed length. The present invention is not limited to this. For example, all of to-be-redefined binary code binU may be converted into redefined binary code binA of a fixed length, or into redefined binary code binA of a variable length.

Further, the embodiment described above is directed to the case in which when the value of to-be-redefined binary code binU is equal to or larger than a rounding threshold, the value of the to-be-redefined binary code binU is regarded as being equal to the rounding threshold. The present invention is not limited to this. All values may be converted into redefined binary code binA.

Further, the embodiment described above is directed to the case in which to-be-redefined binary code binU is an exponential Golomb code indicating a value by the presence/absence and combination of the Golomb suffix, the separator, and the Golomb prefix. The present invention is not limited to this. There are no limitations on the configuration of to-be-redefined binary code binU, and various kinds of code can be used as the to-be-redefined binary code binU.

Further, the embodiment described above is directed to the case in which the CABAC encoding apparatus as an encoding apparatus executes an encoding process in accordance with the H.264/AVC standard. The present invention is not limited to this. For example, the present invention can be applied to an encoding process according to various standards, such as the MPEG (Moving Picture Experts Group) standard and the JPEG (Joint Photographic Experts Group) standard.

Further, the embodiment described above is directed to the case in which "1" is added as the leading mark with respect to a portion of to-be-redefined binary code binU with a small data length. The present invention is not limited to this. For example, if every piece of to-be-redefined binary code binU begins with "1", it is not necessary to add such a leading mark.

Further, the embodiment described above is directed to the case in which for portions with large data length, the Golomb suffix GSX of to-be-redefined binary code binU is used as it is, and the opposite separator SPK and the leading-zeros portion HZ indicate that the binary code concerned has a fixed length and the start position of the Golomb suffix GSX. The present invention is not limited to this. The Golomb suffix GSX may not necessarily be used as it is, and redefined binary code binA of a fixed length may be generated by various other methods.

Further, the embodiment described above is directed to the case of converting the to-be-redefined binary code binU shown in the left part of each of FIGS. 2 and 3 into the redefined binary code binA shown in the right part of each of FIGS. 2 and 3. The present invention is not limited to this. For example, in cases such as when the relationship between symbols ("0" and "1") in the to-be-redefined binary code binU is opposite to that of the above-described embodiment, by reversing the relationship between symbols in the redefined binary code binA, the same effect as that of the above-described embodiment can be attained.

Further, the embodiment described above is directed to the case in which the bin conversion section 24 converts to-be-redefined binary code binU into redefined binary code binA by replacing only the Golomb suffix GSX, by using a conversion table. The present invention is not limited to this. The bottom line is that as long as to-be-redefined binary code binU is converted into redefined binary code binA, there are no limitations on the method of conversion. For example, the bin conversion section may select redefined binary code binA by using a conversion table containing all the possible combinations. In addition, the bin conversion section may generate redefined binary code binA by a program whenever necessary, without using a conversion table. The same applies to the bin inverse conversion section.

Further, the embodiment described above is directed to the case in which the binary decoder 53 converts redefined binary code binA into to-be-redefined binary code binU before executing binary decoding by the binary decoding section 75.

The present invention is not limited to this. To-be-redefined binary code binA may be directly converted into syntax information. The same applies to the binary encoding section 22 in the binary encoder 2, in which case syntax information may be directly converted into redefined binary code binA.

Further, the embodiment described above is directed to the case in which redefined binary code binA is generated in response to a redefinition selection control signal. The present invention is not limited to this. For example, the bin conversion section may output redefined binary code binA or error code with respect to every piece of binary code bin, and the selecting section 25 may make a selection. In this case as well, the selecting section 25 selects binary code bin supplied from either the bin conversion section 24 or the binary encoding section 22 in accordance with a redefinition selection control signal, thereby making it possible to attain the same effect as that of the embodiment described above.

Further, the embodiment described above is directed to the case in which part of syntax information is converted into redefined binary code binA. The present invention is not limited to this. All of syntax information may be converted into redefined binary code binA.

Further, the embodiment described above is directed to the case in which a CABAC encoding program or the like is pre-stored in a ROM, a hard disc drive, or the like. The present invention is not limited to this. The CABAC encoding program or the like may be installed from an external storage medium such as a memory stick (registered trademark of Sony Corporation) into a flash memory or the like. In addition, the CABAC encoding program or the like may be acquired externally via a wireless LAN (Local Area Network) such as USB (Universal Serial Bus) or Ethernet (registered trademark) (Institute of Electrical and Electronics Engineers) 802.11a/b/g, and further distributed by terrestrial digital television broadcasting or BS digital television broadcasting.

It is a matter of course that the same effect can be attained by applying the features described with respect to the CABAC encoding apparatus 1 in <2. Other Embodiments> to the CABAC decoding apparatus 50.

Further, the embodiment described above is directed to the case in which the CABAC encoding apparatus 1 as an encoding apparatus includes the binary encoding section 22 serving as a receiving section and a first encoding section, the transmission path 4 serving as a transferring section, the arithmetic encoding section 35 serving as a second encoding section, the bin conversion section 24 serving as a conversion section, and the bin inverse conversion section 32 serving as an inverse conversion section. The present invention is not limited to this. The encoding apparatus according to an embodiment of the present invention may include a receiving section, a first encoding section, a second encoding section, a conversion section, and an inverse conversion section according to various other configurations.

Further, the embodiment described above is directed to the case in which the CABAC decoding apparatus 50 as a decoding apparatus includes the arithmetic decoding section 62 serving as a receiving section and a first decoding section, the transmission path 54 serving as a transferring section, the binary decoding section 75 serving as a second decoding section, the bin conversion section 64 serving as a conversion section, and the bin inverse conversion section 72 serving as an inverse conversion section. The present invention is not limited to this. The decoding apparatus according to an embodiment of the present invention may include a receiving section, a first decoding section, a second decoding section, a conversion section, and an inverse conversion section according to various other configurations.

The present application contains subject matter related to that disclosed in Japanese Priority Patent Application JP 2009-128118 filed in the Japan Patent Office on May 27, 2009, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An encoding apparatus comprising:
a receiving section receiving syntax information defined by an encoding standard;
a first encoding section encoding the syntax information received by the receiving section to generate encoded information;
a transferring section transferring transmission encoded information based on the encoded information generated by the first encoding section;
a second encoding section encoding reproduced encoded information reproduced from the transmission encoded information transferred by the transferring section;
a conversion section converting the encoded information encoded by the first encoding section into redefined encoded information, to generate the transmission encoded information in accordance with a transfer capacity of the transferring section and a processing speed of encoding in each of the first encoding section and the second encoding section so as not to cause delay in encoding in the first encoding section or the second encoding section; and
an inverse conversion section inversely converting the redefined encoded information converted by the conversion section to generate the reproduced encoded information.

2. The encoding apparatus according to claim 1, wherein the conversion section generates the transmission encoded information so as to allow a number of pieces of the reproduced encoded information processed during one cycle by one encoding section of the first and second encoding sections to be transferred in one cycle via the transferring section.

3. The encoding apparatus according to claim 2, wherein the conversion section sets a data length of each individual piece of the transmission encoded information equal to or less than a divided value obtained by dividing a transfer capacity of the transferring section per cycle by a number of pieces of the reproduced encoded information that can be processed during one cycle by the one encoding section.

4. The encoding apparatus according to claim 3, wherein:
the first encoding section applies binary encoding to the syntax information; and
the second encoding section applies arithmetic encoding to the encoded information.

5. The encoding apparatus according to claim 4, wherein the conversion section converts to-be-redefined information, which is information to be redefined into the redefined encoded information, of the encoded information encoded by the first encoded section, into the redefined encoded information so as to make at least part of the to-be-redefined information have a fixed length equal to or less than the divided value.

6. The encoding apparatus according to claim 5, wherein the conversion section converts a portion of the to-be-redefined information having a large data length into the redefined encoded information of a fixed length.

7. The encoding apparatus according to claim 6, wherein if a value of the to-be-redefined information is larger than a rounding threshold, the conversion section regards the value of the to-be-redefined information as being equal to the rounding threshold.

8. The encoding apparatus according to claim 7, wherein at least part of the to-be-redefined information is represented in exponential Golomb indicating a value of the syntax information by presence/absence and combination of a Golomb suffix indicating a value of the syntax information by its number of digits and value, a separator indicating a start position of the Golomb suffix, and a Golomb prefix added before the separator and indicating a number of digits of the Golomb suffix.

9. The encoding apparatus according to claim 8, wherein:
at least part of the to-be-redefined information is in truncated unary indicated by a number of successive digits of a same symbol and presence/absence of an opposite symbol added to its end which is different from the same symbol; and
the opposite symbol is the same symbol as a symbol of the separator.

10. The encoding apparatus according to claim 8, wherein the to-be-redefined information has a sign indicating positive or negative added to its end.

11. The encoding apparatus according to claim 8, wherein the first encoding section encodes the to-be-redefined information in UEGk.

12. The encoding apparatus according to claim 11, wherein the syntax information is motion vector information indicating a motion vector or a coefficient absolute value indicating a value of a quantization coefficient.

13. The encoding apparatus according to claim 12, wherein the encoding standard is an AVC/H.264 standard.

14. The encoding apparatus according to claim 12, wherein the conversion section converts a portion of the to-be-redefined information having a small data length into the redefined encoded information of a variable length by adding a leading mark represented by a symbol different from a symbol of the separator to the beginning of the to-be-redefined information.

15. The encoding apparatus according to claim 14, wherein the conversion section converts a portion of the to-be-redefined information having a large data length into the redefined encoded information having the Golomb suffix, an opposite separator indicating a start position of the Golomb suffix and represented by a symbol opposite to the symbol of the separator, and a leading-opposite-symbols portion including symbols opposite to the symbol of the opposite separator and placed before the opposite separator, the leading-opposite-symbols portion having a number of digits equal to a fixed length minus a number of digits added in accordance with a number of digits of the Golomb suffix.

16. The encoding apparatus according to claim 15, wherein the conversion section selects a corresponding piece of the redefined encoded information from the to-be-redefined information by using a conversion table, and if the to-be-redefined information has the Golomb suffix, the conversion section replaces the Golomb suffix in the redefined encoded information by the Golomb suffix in the to-be-redefined encoded information to convert the to-be-redefined information into the redefined encoded information.

17. The encoding apparatus according to claim 16, wherein if the to-be-redefined information has the sign, the conversion section replaces the sign in the redefined encoded information by the sign in the to-be-redefined information.

18. An encoding method comprising the steps of:
receiving syntax information defined by an encoding standard;
performing a first encoding of encoding the received syntax information to generate encoded information;
transferring transmission encoded information based on the encoded information generated by the first encoding;
performing a second encoding of encoding reproduced encoded information reproduced from the transferred transmission encoded data;
converting the encoded information encoded by the first encoding into redefined encoded information, to generate the transmission encoded information in accordance with a transfer capacity of the transferring and a processing speed of each of the first encoding and the second encoding so as not to cause delay in the first encoding or the second encoding; and
inversely converting the converted redefined encoded information to generate the reproduced encoded information.

19. A decoding apparatus comprising:
a receiving section receiving a bit stream encoded in accordance with an encoding standard;
a first decoding section decoding the bit stream received by the receiving section to generate decoded information;
a transferring section transferring transmission decoded information based on the decoded information generated by the first decoding section;
a second decoding section decoding reproduced decoded information reproduced from the transmission decoded information transferred by the transferring section;
a conversion section converting the decoded information decoded by the first decoding section into redefined decoded information, to generate the transmission decoded information in accordance with a transfer capacity of the transferring section and a processing speed of decoding in each of the first decoding section and the second decoding section so as not to cause delay in decoding in the first decoding section or the second decoding section; and
an inverse conversion section inversely converting the redefined decoded information converted by the conversion section to generate the reproduced decoded information.

20. A decoding method comprising the steps of:
receiving a bit stream encoded in accordance with an encoding standard;
performing a first decoding of decoding the received bit stream to generate decoded information;
transferring transmission decoded information based on the decoded information generated by the first decoding;
performing a second decoding of decoding reproduced decoded information reproduced from the transferred transmission decoded information;
converting the decoded information decoded by the first decoding into redefined decoded information, to generate the transmission decoded information in accordance with a transfer capacity of the transferring and a processing speed of each of the first decoding and the second decoding so as not to cause delay in the first decoding or the second decoding; and
inversely converting the converted redefined decoded information to generate the reproduced decoded information.

* * * * *